(12) United States Patent
Miyoshi et al.

(10) Patent No.: US 7,945,000 B2
(45) Date of Patent: *May 17, 2011

(54) WIRELESS COMMUNICATION APPARATUS

(75) Inventors: Kenichi Miyoshi, Kanagawa (JP);
Ayako Horiuchi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/841,548

(22) Filed: Jul. 22, 2010

(65) Prior Publication Data

US 2010/0284448 A1 Nov. 11, 2010

Related U.S. Application Data

(63) Continuation of application No. 11/817,526, filed as application No. PCT/JP2006/304139 on Mar. 3, 2006, now Pat. No. 7,787,524.

(30) Foreign Application Priority Data

Mar. 3, 2005 (JP) .................................. 2005-059245

(51) Int. Cl.
*H04L 27/06* (2006.01)
(52) U.S. Cl. ........ 375/340; 375/211; 375/214; 375/341; 398/6; 370/226; 455/7; 714/704; 714/746; 714/751; 714/752; 714/774; 714/786
(58) Field of Classification Search .................. 714/704, 714/706, 751–758, 764, 774, 786; 370/226; 398/6; 455/7–25; 375/211, 214, 340, 341
See application file for complete search history.

(56) References Cited

U.S. PATENT DOCUMENTS

| 6,137,784 A | 10/2000 | Wallerius | |
|---|---|---|---|
| 7,787,524 B2 * | 8/2010 | Miyoshi et al. | ............... 375/214 |
| 2003/0124976 A1 * | 7/2003 | Tamaki et al. | ................. 455/15 |

(Continued)

FOREIGN PATENT DOCUMENTS

JP  2000269825 A  9/2000

(Continued)

OTHER PUBLICATIONS

International Search Report for PCT/JP2006/304139; Apr. 11, 2006.

(Continued)

*Primary Examiner* — Curtis B Odom
(74) *Attorney, Agent, or Firm* — Pearne & Gordon LLP

(57) ABSTRACT

An object of the invention is to provide a wireless communication apparatus which can correct error flexibly without wasting consumed resources while maintaining the improvement of reliability resulted from error correction. The wireless communication apparatus (relay station) 12 includes a receiving antenna 41 for receiving signals transmitted from the transmission station, a receiving RF section 42 for high-frequency amplifying the received signal, an error correction decoding section 43 for subjecting the received signal to the error correction decoding processing and outputting soft decision values and decoded bits, an error detection section 44 for subjecting the signal after the error correction decoding processing to the hard decision processing to detect error of the signal subjected to the hard decision processing, a switching section 45 for switching the soft decision values and the decoded bits, a re-coding section 46 for re-coding extracted ones of the soft decision values, a transmission RF section 47 for modulating the re-coded soft decision values and a transmission antenna 48 for transmitting the signal to the receiving station.

7 Claims, 10 Drawing Sheets

U.S. PATENT DOCUMENTS

| | | |
|---|---|---|
| 2004/0037291 A1 | 2/2004 | Attar et al. |
| 2004/0264561 A1 | 12/2004 | Alexander et al. |
| 2006/0080581 A1 | 4/2006 | Ono |

FOREIGN PATENT DOCUMENTS

| | | |
|---|---|---|
| JP | 2003-046484 A | 2/2003 |
| JP | 2003-309500 A | 10/2003 |
| JP | 2004-304620 A | 10/2004 |
| WO | 2005-013542 A | 2/2005 |

OTHER PUBLICATIONS

European Search Report for EP06728618 (based on PCT/JP2006/304139); Jun. 26, 2009.

Laneman JN et al; "Energy-efficient antenna sharing and relaying for wireless networks". IN: Wireless Communications and Networking Conference, 2000. IEEE, Sep. 23-28, 2000; Piscataway NJ. USA, IEEE, vol. 1, Sep. 23, 2000; pp. 7-12. XP010532457.

Miyano T et al; "Cooperative relaying technique with space time block code for multihop communications among single antenna terminals". IN: Technical Report of IEICE, Mar. 2003; pp. 71-76.

Patrick Herhold, et al.; A Simple Cooperative Extension to Wireless Relaying pp. 36-38, Int. Zurich Seminar on Communications (IZS), Feb. 18-20, 2004.

Poramte Tarasak, et al., Differential Modulation for Two-User Cooperative Diversity Systems, pp. 3389-3393, IEEE Communications Society, Globecom 2004.

J. Nicholas Laneman, Network Coding Gain of Cooperative Diversity, pp. 106-112, MILCOM 2004-2004 IEEE Military Communications Conference.

\* cited by examiner

| HARD DECISION VALUE | 1 | -1 | -1 | 1 | 1 |
|---|---|---|---|---|---|
| SOFT DECISION VALUE | 0.97 | -1.23 | -0.67 | 0.96 | 0.67 |

FIG. 11

| PROCESSING ABILITY OF RECEIVING STATION | ITERATION NUMBER OF RECEIVING STATION | ITERATION NUMBER OF RELAY STATION |
|---|---|---|
| HIGH | 8 | 2 |
| INTERMEDIATE | 5 | 5 |
| LOW | 2 | 8 |

WIRELESS COMMUNICATION APPARATUS

This application is a continuation of U.S. patent application Ser. No. 11/817,526 filed Aug. 31, 2007, which is incorporated herein by reference in its entirety.

TECHNICAL FIELD

The present invention relates a wireless communication apparatus having a function of relaying a signal transmitted from a transmission station to a receiving station.

BACKGROUND ART

FIG. 12 shows the schematic configuration of a wireless communication apparatus (hereinafter called a relay station or a repeater) 123 of a related art. The relay station 123 of the related art includes a receiving antenna 41 for receiving radio wave from a not-shown transmission station, a receiving RF section 42 for high-frequency amplifying the received signal, an error correction decoding section 43 for correcting the error of the signal caused in a transmission path and decoding the signal thus corrected, hard decision sections 121 and 122 each for determining signal error with "0" and "1", an error detection section 44 for detecting error of the signal subjected to the hard decision processing, a switching section 45 for switching the outputs of the hard decision sections 121 and 122, a re-coding section 46 for re-coding the signal outputted from the switching section 45, a transmission RF section 47 for high-frequency amplifying the re-coded signal and a transmission antenna 48 for transmitting the high-frequency signal to a not-shown receiving station.

Such the repeater 123 of the related art subjects the received signal to an error correction decoding processing (the turbo coding, the convolution coding, the LPDC coding (low density parity check coding) etc.) and then subjects the hard decision bits after the error correction decoding (a bit sequence obtained by subjecting the received signal to the error correction using the "hard decision") to an error detection processing.

When no error is detected in this case, the bits (hard decision bits) after the error correction decoding are again subjected to the error correction coding and then relayed and transmitted. On the other hand, when any error is detected in this case, the relaying and transmission processings are not performed or the hard decision bits before the error correction decoding are relayed and transmitted.

The signal after the error correction decoding processing takes a value of "1" or "−1". However, the signal may be converted into a bit sequence of "0" and "1" by converting the values "−1" and "1" into "1" and "0" respectively, for example. This bit sequence is called as bits after the error correction decoding and the bits after the error correction decoding are subjected to the error detection processing (see a non-patent document, for example).

Non-patent document 1: Cooperative Relaying Technique with Space Time Block Code for Multihop Communications among Single Antenna Terminals, TECHNICAL REPORT OF IEICE. WBS2003-149, A-P2003-342, RC5203-365 MoMuC2003-143, MW2003-311 (2004-03)

DISCLOSURE OF THE INVENTION

Problems to be Solved by the Invention

However, according to the aforesaid method of the related art, there is a circumstance that the error rate property at the receiver of the final stage degrades when any error is detected at the repeater. Further, in the case where the repeater does not perform the relaying and transmission operation when any error is detected, the error rate degrades largely since the receiver of the final stage can not receive the signal.

On the other hand, in the case where the hard decision bits before the error correction decoding are relayed and transmitted when any error is detected, since the decision error caused at the relay station is propagated to the receiver of the final stage, the error rate property at the receiver of the final stage degrades.

That is, when a relay station on the way performs the "hard decision", since all the information is converted into "1" or "0", the information is deleted because the bit values "0.9" and "0.51" etc. before conversion result in the same bit value "1" after conversion. Such a phenomenon is accumulated to result in the degradation of the error rate property at the receiver of the final stage.

Further, according to the aforesaid method of the related art, there is a circumstance that the error correction decoding processing in the repeater becomes wasteful when any error is detected at the repeater. This is because when there is any error in the hard decision bits after the error correction decoding processings are repeatedly performed, since the signal is not relayed, "the resource consumed in the relay station" and "the improvement of the reliability" resulted from the error correction decoding processings becomes wasteful.

Since the error correction decoding processing requires a huge scale of repetitive calculations, the relay station consumes various kinds of resources (an electric power, a power for a CPU etc.). Thus, the resources consumed for the error correction decoding becomes wasteful when the signal is not relayed/transmitted.

Further, the error correction decoding processing is intended to improve the reliability of the received signal to reduce (correct) the error. In the method of the related art in which the signal is not relayed/transmitted when there remains the error of only one bit or more after the error correction processing, the reliability having been improved becomes wasteful.

The invention is made in view of the aforesaid circumstances of the related art and an object of the invention is to provide a wireless communication apparatus which can correct error flexibly without wasting consumed resources while maintaining the improvement of reliability resulted from error correction.

Means for Solving the Problems

The wireless communication apparatus according to the invention subjects a received signal to the error correction decoding processing and transmits a soft decision value obtained by re-coding the signal after the error correction decoding processing as a rely signal. In this case, the hard decision value means a decision value such as a bit (0, 1). In the wireless communication, since bits are treated as "1" and "−1", the hard decision value in a wireless communication device is "1" or "−1". On the other hand, the soft decision value is not "1" or "−1" but a decision value having an intermediate value (for example, 0.55).

The wireless communication apparatus according to the invention, when error is detected in the hard decision bits after the error correction decoding processing, relays and transmits a soft decision value obtained by re-coding the signal after the error correction decoding processing as a relay signal. In this case, when there is no error in the hard decision bit, since it is wasteful to send the soft decision bit, the soft decision bit is not transmitted. However, if a special solution (binary value) obtained by reducing the decision step of the soft decision is defined as the hard decision, the soft decision value may be transmitted.

According to the wireless communication apparatus of the invention, since the reliability of the signal after the error correction decoding processing is higher than that of the hard decision bit before the error correction decoding processing, it is possible to transmit a relay signal higher in the reliability as compared with that of the method of the related art. Thus, the possibility that a receiver of the final stage can receive the signal correctly can be improved. Further, since the soft decision value can be used continuously as it is, the entire calculation time can be shortened.

Further, according to the wireless communication apparatus of the invention, when error is detected in the hard decision bits after the error correction decoding processing, the soft decision value is extracted from the signal under the error correction decoding processing and a signal obtained by re-coding the soft decision value is relayed and transmitted as the relay signal. In contrast, when no error is detected, the bits after the error correction decoding processing is re-coded and transmitted like the related art. The signal obtained by re-coding a signal having no error becomes a complete signal at the time of relaying and transmitting where the bit reliability is highest.

According to the wireless communication apparatus of the invention, since the signal which reliability is improved by being subjected to the error correction decoding processing can be transmitted, the possibility that the receiving station can correctly receive the signal can be enhanced. Further, the resources consumed at the relay station can be utilized effectively. Since the processing performed at the relay station results in the effects of "the improvement of reliability", the resources consumed at the relay station can not be wasteful.

Further, according to the wireless communication apparatus of the invention, the iteration number can be changed in accordance with the ability of the error correction decoding processing at the receiving station in a manner that the iteration number is reduced when the ability of the error correction decoding processing at the receiving station is high and the iteration number is increased when the ability of the error correction decoding processing at the receiving station is low.

The delay amount at the relay station becomes larger as the iteration (repetitive calculation) number at the relay station increases. Thus, the iteration number at the relay station is desired be as small as possible. Thus, the relay delay amount is made small while maintaining the final quality. Thus, when the error correction ability of a final-stage receiver is high, since the final quality (error rate property) can be kept high even if the iteration number at the relay station is reduced, the relay delay amount can be reduced while maintaining the quality.

Further, according to the wireless communication apparatus of the invention, the throughput of the system entirety can be improved. That is, when the repetition number of the error correction decoding processings at a repeater is reduced, a single repeater can relay signals to a plurality of receivers, the throughput of the system entirety can be improved.

The wireless communication apparatus according to the invention is arranged in a manner that the wireless communication apparatus having a function of relaying a signal transmitted from a transmission station to a receiving station, includes:

a receiver which receives a signal from the transmission station;

a error correction decoding processor which subjects the received signal to an error correction decoding processing;

a hard decision processor which subjects the signal after the error correction decoding processing to a hard decision processing;

a detector which detects error of the signal subjected to the hard decision processing;

an extractor which extracts a soft decision value from a signal which is being subjected to the error correction decoding processing when there is error in the signal subjected to the hard decision processing;

a re-coder which re-codes the extracted soft decision value; and a transmitter which transmits the re-coded soft decision value.

Further, in the wireless communication apparatus according to the invention, the extractor for extracting the soft decision value extracts the soft decision value based on an iteration number. Further, in the wireless communication apparatus according to the invention, the extractor for extracting the soft decision value extracts the soft decision value based on an iteration time.

Further, in the wireless communication apparatus according to the invention, the error correction decoding processor for subjecting the error correction decoding processing includes:

a calculator which calculates bit likelihood of the received signal;

a repetitive processor which processes the received signal repeatedly to correct error of the signal; and a converter which converts the bit likelihood of the signal which is being subjected to the repetitive processing into the soft decision value.

Further, in the wireless communication apparatus according to the invention, the repetitive processor includes:

a first decoder which decodes the received signal;

an interleaver which rearranges output data of the first decoder;

a second decoder which decodes an output of the interleaver; and a deinterleaver which rearranges output data of the second decoder and returns the rearranged output data of the second decoder to the first decoder.

Further, the wireless communication apparatus according to the invention further includes a determination unit which determines an iteration number in accordance with ability of the error correction decoding processing at the receiving station. Further, in the wireless communication apparatus according to the invention, the determination unit for determining the iteration number, based on iteration number instruction information transmitted from the receiving station, reduces the iteration number when the ability of the error correction decoding processing at the receiving station is high and increases the iteration number when the ability of the error correction decoding processing at the receiving station is low.

Effects of the Invention

The wireless communication apparatus according to the invention can eliminate a problem of the related art that, despite that the signal reliability is improved by performing the error correction decoding processing, the improvement of the reliability resulted by the error correction decoding processing becomes wasteful when there is error of at least one bit in the hard decision bits after the error correction decoding.

According to the invention, since a final-stage receiver can attain the effects of the improvement of the data reliability resulted by the error correction decoding processing, the error correction property at the final-stage receiver can be improved even if any error is detected after the error correction decoding processing at the repeater.

Further, when the method according to the invention is compared with the method of the related art under the condition that the required condition of the error rate at the final-stage receiver is made constant, the load of the error correction decoding processing at the final-stage receiver can be reduced as compared with the method of the related art. This is because, since the bit reliability at the relay station is enhanced, the gain of the bit reliability which is required to be obtained at the error correction decoding processing necessary for satisfying the desired error rate at the final-stage receiver can be made small as compared with the related art.

BRIEF DESCRIPTION OF THE DRAWINGS

FIG. 11 An explanatory diagram showing the distribution of the iteration number in this embodiment.

Figure 1:
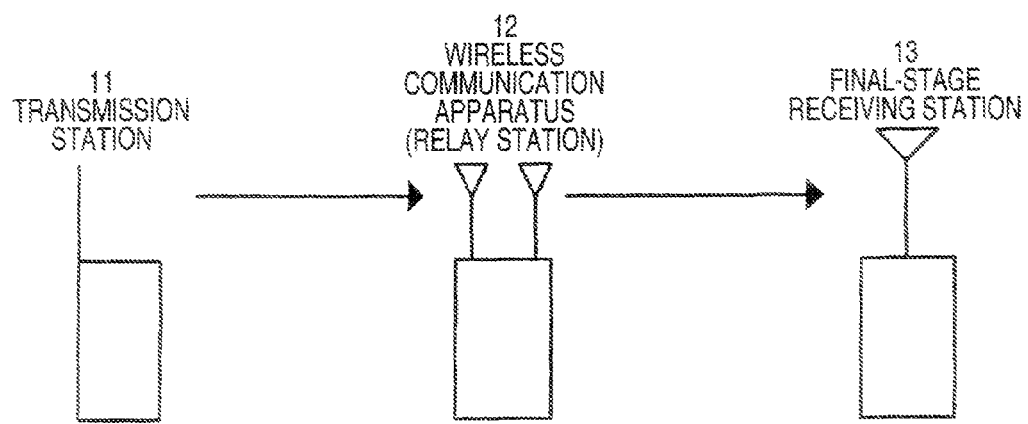
FIG. 1 A diagram showing the system configuration of a wireless communication apparatus (relay station) for explaining an embodiment of the invention.

EXPLANATION OF SIGNS 11 transmission station
12, 103, 123 wireless communication apparatus (relay station)
13 final-stage receiving station
21 error correction coding section
22, 47 transmission RF section
23, 48 transmission antenna
31, 41 receiving antenna
32, 42 receiving RF section
33, 43 error correction decoding section
34 hard decision section
44 error detection section
45 switching section
46 re-coding section
51 bit likelihood calculation section
52 decoder 1
53 deinterleaver
54 interleaver
55 decoder 2
56 likelihood/soft decision value conversion section
57 hard decision section
101 interaction number instruction information detecting section
102 interaction number decision section

BEST MODE FOR CARRYING OUT THE INVENTION

First Embodiment

FIG. 1 is a diagram showing the system configuration of a wireless communication apparatus (relay station) for explaining the embodiment of the invention. A signal transmitted from a transmission station 11 is relayed by a wireless communication apparatus (relay station) 12 and transmitted to a final-stage receiving station 13.

Figure 2:
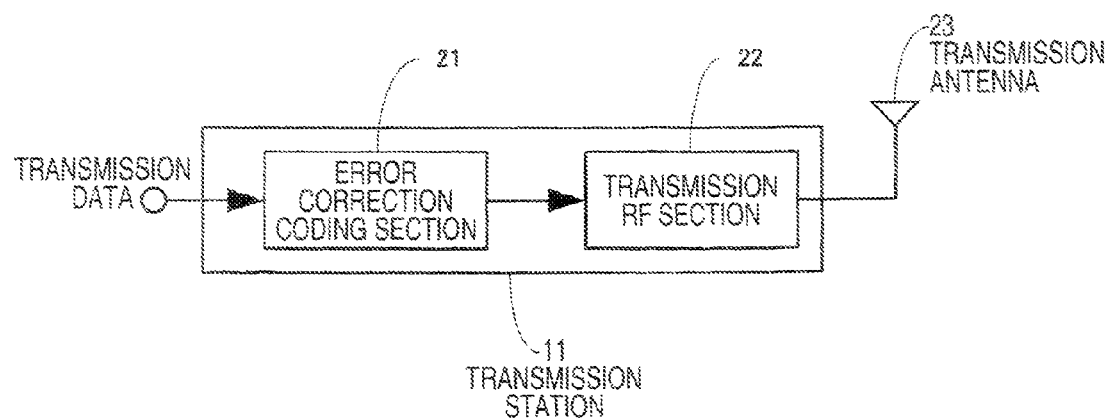
FIG. 2 A schematic block diagram of a transmission station 11.

FIG. 2 shows a schematic block diagram of the transmission station 11. The error correction coding section 21 of the transmission station 11 subjects transmission data to the error correction coding, then a transmission RF section 22 modulates the signal after the error correction coding and a transmission antenna 23 transmits the modulated signal to the relay station.

Figure 3:
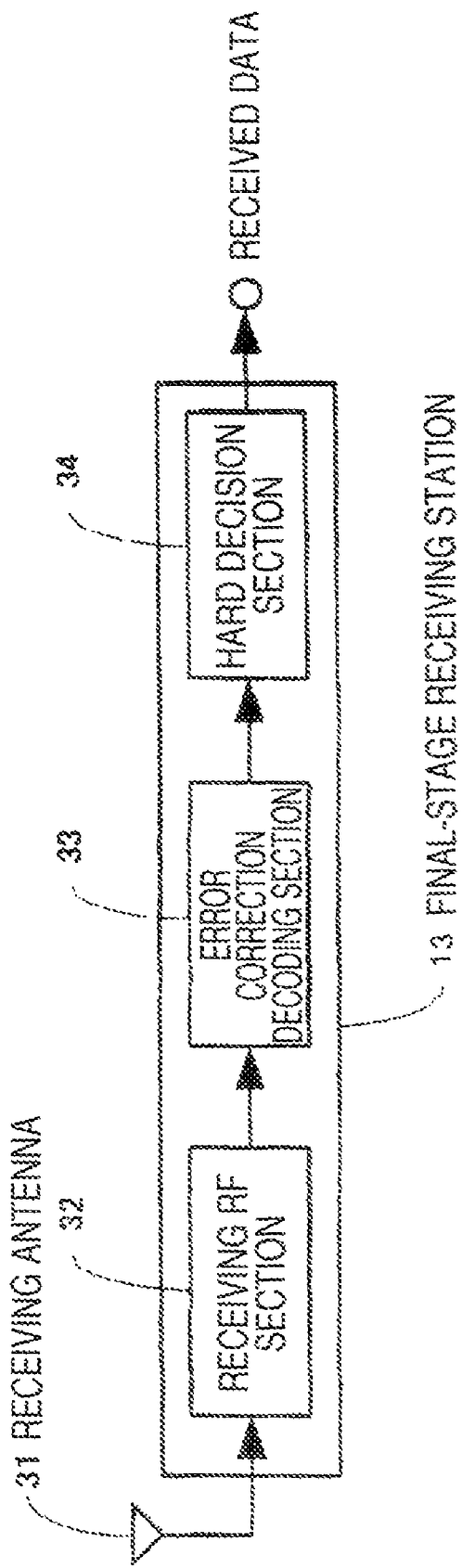
FIG. 3 A schematic block diagram of a final-stage receiving station 13.

FIG. 3 shows a schematic block diagram of the final-stage receiving station 13. Radio wave transmitted from the relay station is received by a receiving antenna 31, then demodulated by a receiving RF section 32 and inputted to an error correction decoding section 33. The error correction decoding section 33 subjects the received signal to the error correction processing, and a hard decision section 34 performs the hard decision to convert the signal after the error correction processing into information of "−1" and "1" and performs the bit decision to output data of "0" and "1" as the received data.

Figure 4:
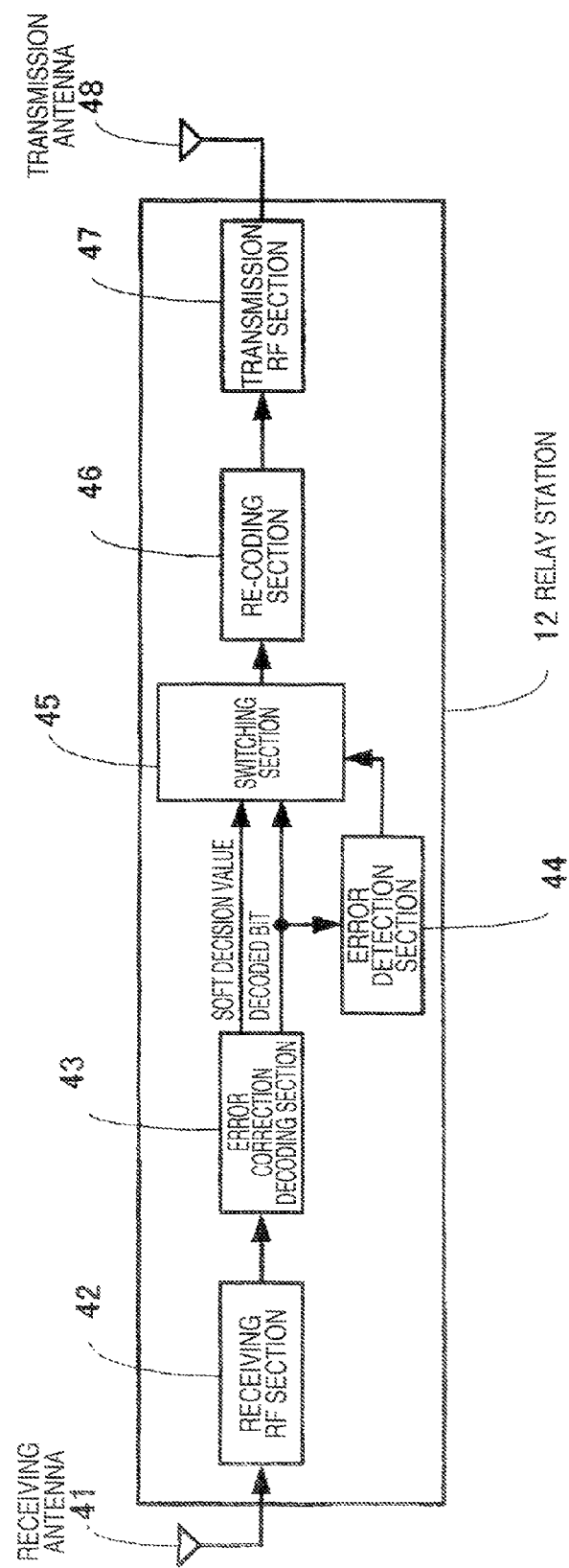
FIG. 4 A schematic block diagram of a wireless communication apparatus (relay station) 12 of the embodiment.

FIG. 4 shows a schematic block diagram of the wireless communication apparatus (relay station) 12 of the embodiment. The wireless communication apparatus (relay station) 12 includes a receiving antenna 41 for receiving signals transmitted from the transmission station, a receiving RF section 42 for high-frequency amplifying the received signal, an error correction decoding section 43 for subjecting the received signal to the error correction decoding processing and outputting soft decision values and decoded bits, an error detection section 44 for subjecting the signal after the error correction decoding processing to the hard decision processing to detect error of the signal subjected to the hard decision processing, a switching section 45 for switching the soft decision values and the decoded bits, a re-coding section 46 for re-coding extracted ones of the soft decision values, a transmission RF section 47 for modulating the re-coded soft decision values and a transmission antenna 48 for transmitting the signal to the receiving station.

The wireless communication apparatus according to the embodiment subjects the received signal to the error correction decoding processing and then subjects the decoded signal to the hard decision processing to generate the hard decision bits thereby to detect error (CRC (Cyclic Redundancy Check) etc. is used for the error detection). When the hard decision signal has no error, the hard decision bits after the error correction decoding are re-coded, then modulated by the transmission RF section 47 and transmitted. When the hard decision signal has any error, the soft decision values are extracted from the signal after the error correction processing, then the soft decision values are re-coded and modulated by the transmission RF section 47 and transmitted.

Figure 5:
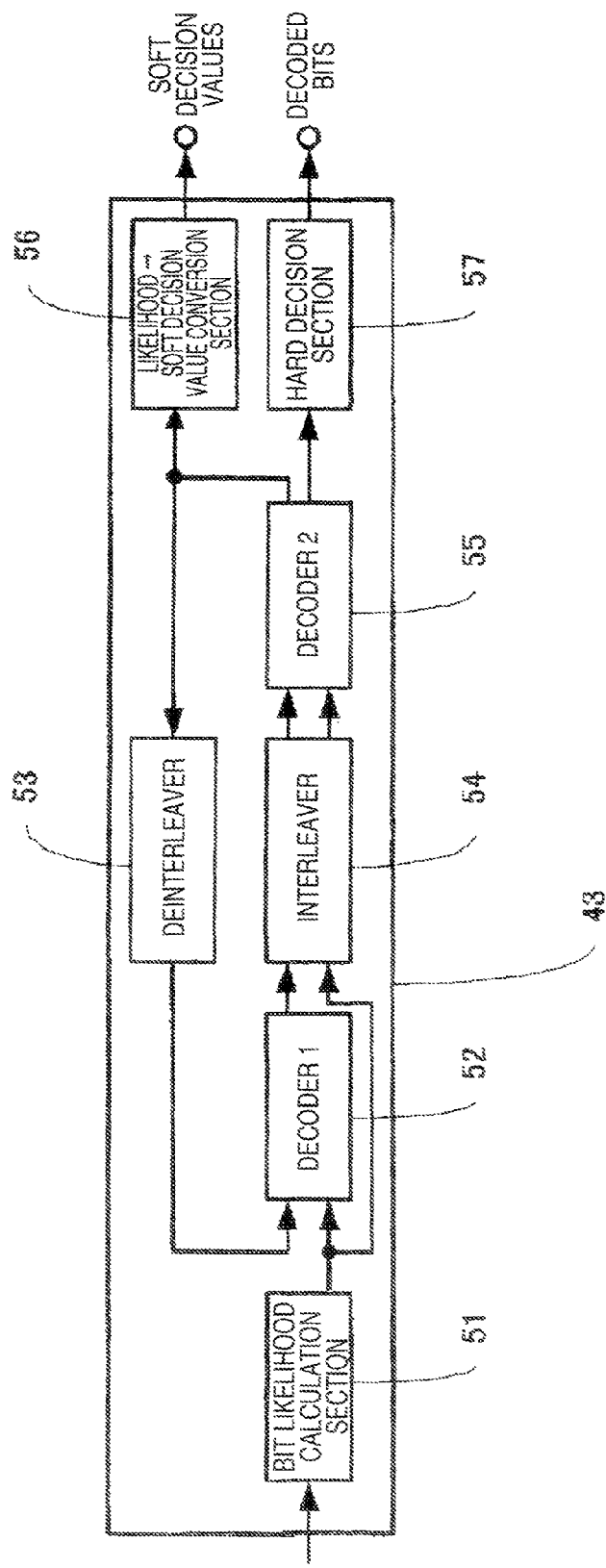
FIG. 5 A schematic block diagram of an error correction decoding section 43 in the wireless communication apparatus of the embodiment.

FIG. 5 shows a schematic block diagram of the error correction decoding section 43 in the wireless communication apparatus of the embodiment. This block diagram shows the decoding processing of the turbo codes. The error correction decoding section 43 includes a bit likelihood calculation section 51 for calculating bit likelihood representing the provability of the correctness of data, a decoder 1 (52) for decoding the signal, an interleaver 54 for dividing inputted continuous data into different blocks and relocating them, a decoder 2 (55) for further decoding the output of the interleaver 54, a deinterleaver 53 for restoring the relocated data in the original order, a likelihood/soft decision value conversion section 56 for extracting the soft decision values from the output of the decoder 2 (55) and outputting the extracted values, and a hard decision section 57 for subjecting the output of the decoder 2 (55) to the hard decision and outputting decoded bits.

Figures 6, 7:
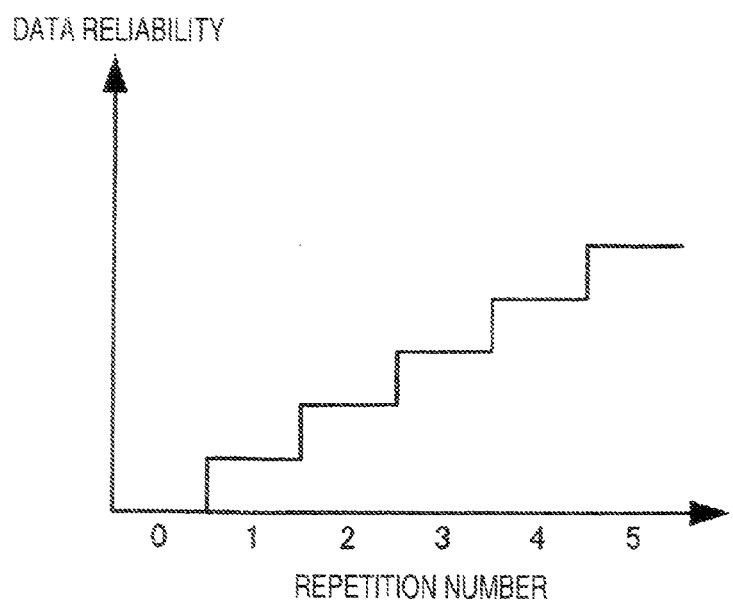
FIG. 6 A diagram for explaining that the reliability of data is improved by the repetition of error correction decoding processings.
FIG. 7 A diagram for comparing soft decision values and hard decision values.

In the decoding processing of the turbo codes of the error correction decoding section 43 of the embodiment, the received signal is repeatedly processed to correct the error. First, the decoder 1 (52) decodes the received signal, then the interleaver 54 shuffles the data and the decoder 2 (55) decodes the shuffled data. Further, the decoder 1 (52) again decode the deinterleaved signal. When such the iteration is repeated, the reliability of data is improved as shown in FIG. 6. In the case of the turbo coding, the iteration is executed for about five times usually.

In this manner, the iteration means the repetitive processings. The reliability of the signal can be improved by repeating the calculation. The reliability of the signal is further improved as the number o the iterations increases. However, in this case, since it takes a longer time for the error correction decoding processings, the maximum number of the repetition is usually determined. In general, when the iteration is executed for about five times, the degree of the effects of further improving the reliability reduces in the iteration executed at the sixth time or more. Thus, in general, the repetition of about five times is set at the maximum.

FIG. 7 shows the soft decision values and the hard decision values in a comparative manner. The hard decision value takes a value "+1" when a value is larger than "0" and takes a value "−1" when the value is smaller than "0". In contrast, the soft decision value takes a value smaller than 0.

Figure 8:
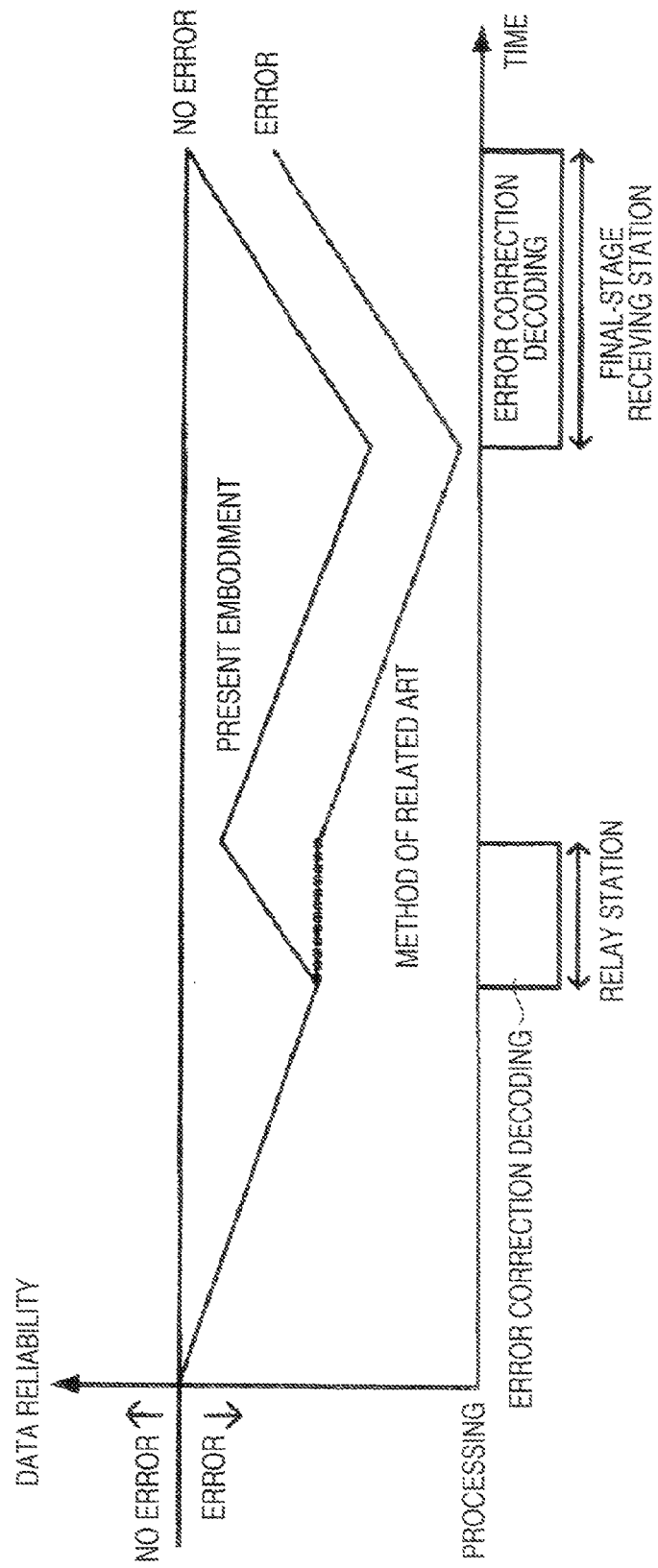
FIG. 8 A diagram showing the data reliability in the case where there is any error in a signal after the error correction decoding at a relay station in a comparative manner between the method of the related art and the method of the embodiment.

FIG. 8 shows the data reliability in the case where there is any error in the signal after the error correction decoding at the relay station in a comparative manner between the method of the related art and the method of the embodiment. At the point where the signal is transmitted from the transmission station, the reliability of the signal is high since there is no error in the transmission signal. However, the reliability of the transmission path degrades as the signal is transmitted in a wireless manner from the transmission station to the relay station.

When there is any error in the received signal, the relay station of the embodiment re-codes the soft decision values of the signal after the error correction decoding and transmits the re-coded data, so that the signal improved in its data reliability at the relay station can be relayed and transmitted.

On the other hand, when there is any error in the received signal, the relay station of the related art re-codes the hard decision values of the signal before the error correction decoding and transmits the re-coded data, so that the relay station can not improve the data reliability.

When the relay station of the embodiment is employed, since the reliability of the received signal can be improved by the error correction decoding processing at the final-stage receiving station, the error can be eliminated. In contrast, when the relay station of the related art is employed, since the data reliability can not be restored until the error is completely removed even if the error correction decoding processing is performed at the final-stage receiving station, there remains the error.

As explained above, according to the embodiment, since the quality of the received signal at the final-stage receiving station can be improved, the error rate property at the final-stage receiving station can be improved.

Second Embodiment

Figure 9:
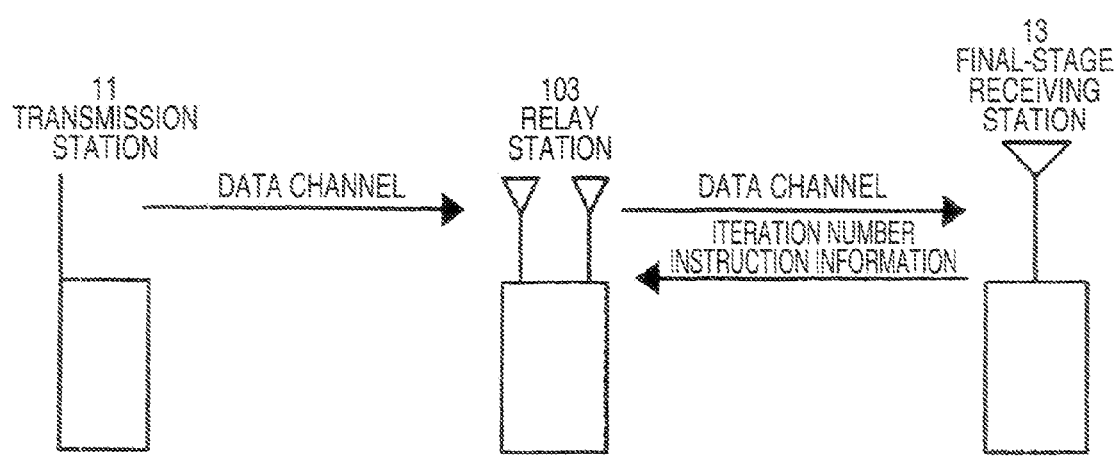
FIG. 9 A diagram showing the system configuration of a wireless communication apparatus (relay station) according to the second embodiment of the invention.

FIG. 9 is a diagram showing the system configuration of a wireless communication apparatus (relay station) according to the second embodiment of the invention. Data channel transmitted from a transmission station 11 is relayed by a wireless communication apparatus (relay station) 103 and transmitted to a final-stage receiving station 13. The final-stage receiving station 13 transmits iteration number instruction information to the relay station 103.

Figure 10:
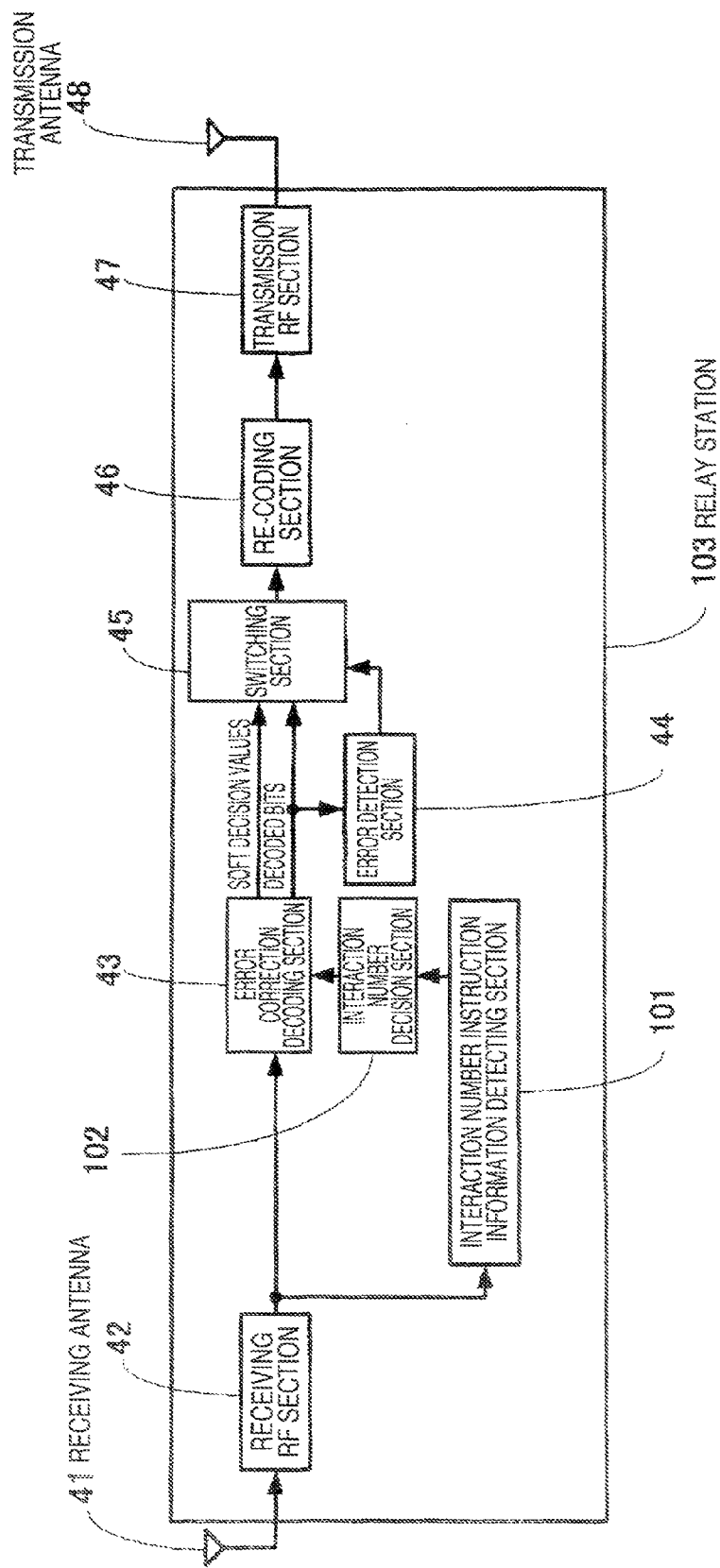
FIG. 10 A schematic block diagram of the wireless communication apparatus (relay station) 103 of this embodiment.
Figure 12:
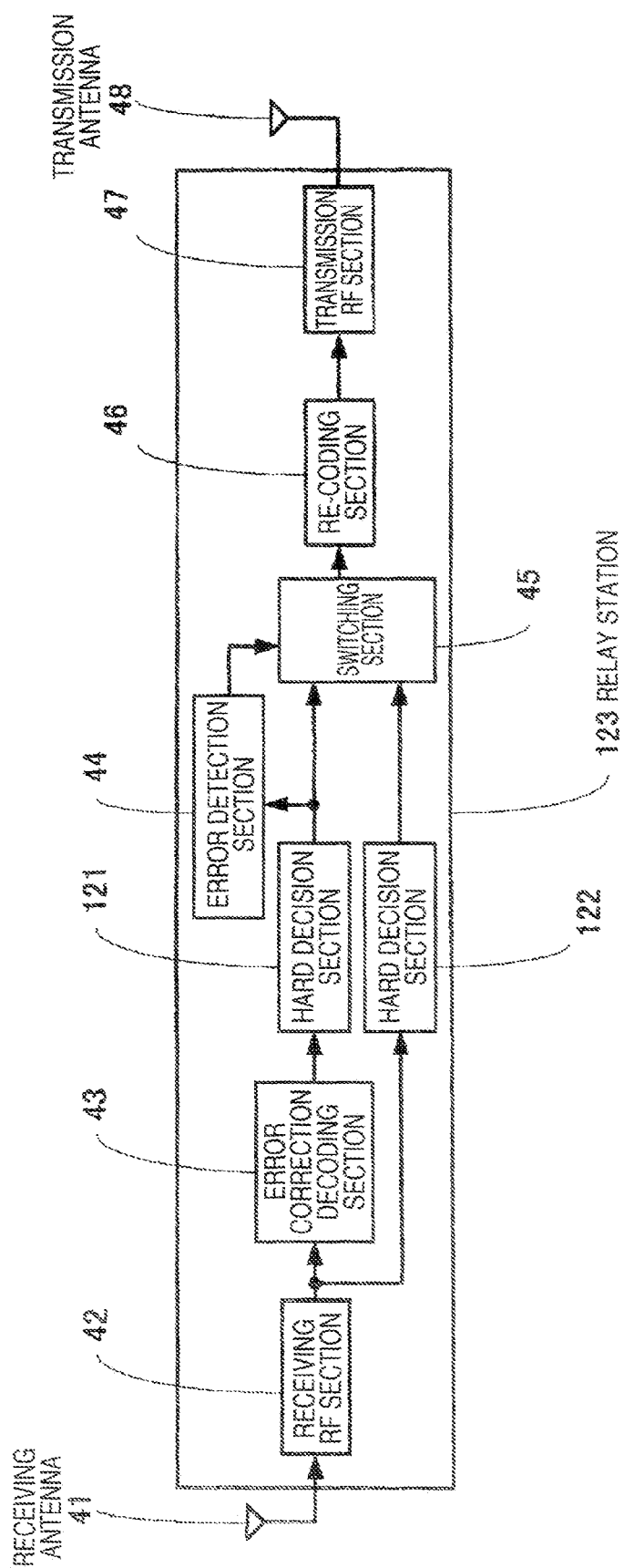
FIG. 12 A block diagram of a relay station of the related art.

FIG. 10 shows a schematic block diagram of the wireless communication apparatus (relay station) 103 of this embodiment. The wireless communication apparatus (relay station) 103 includes a receiving antenna 41 for receiving signals transmitted from the transmission station, a receiving RF section 42 for high-frequency amplifying the received signal, an interaction number instruction information detecting section 101 for detecting iteration number instruction information from the received signal, an interaction number decision section 102 for determining the iteration number, an error correction decoding section 43 for subjecting the received signal to the error correction decoding processing for the number of times equal to the determined iteration number and outputting soft decision values and decoded bits, an error detection section 44 for subjecting the signal after the error correction decoding processing to the hard decision processing to detect error of the signal subjected to the hard decision processing, a switching section 45 for switching the soft decision values and the decoded bits, a re-coding section 46 for re-coding extracted ones of the soft decision values, a transmission RF section 47 for modulating the re-coded soft decision values and a transmission antenna 48 for transmitting the signal to the receiving station.

According to the wireless communication apparatus (relay station) 103 of this embodiment, since the iteration number instruction information is notified from the final-stage receiving station 13, the iteration number is controlled so that the error correction decoding processings are performed for the designated number of times.

FIG. 11 shows the distribution of the iteration number in this embodiment. When the processing ability of the receiving station is high, that is, when the error correction decoding processing is performed at a high speed, the iteration number at the receiving station is large. In contrast, when he processing ability of the receiving station is low, the iteration number a the receiving station is small.

In this embodiment, the iteration number at the relay station is controlled in accordance with the processing ability of the receiving station. As shown in FIG. 11, when the processing ability of the receiving station is high (the iteration is possible for eight times), the receiving station transmits the iteration number instruction information to the relay station so that the iteration number at the relay station is two.

When the processing ability of the receiving station is intermediate (the iteration is possible for five times), the receiving station transmits the iteration number instruction information to the relay station so that the iteration number at the relay station is five. Further, when the processing ability of the receiving station is low (the iteration is possible for two times), the receiving station transmits the iteration number instruction information to the relay station so that the iteration number at the relay station is eight. Thus, the degree of relay delay at the relay station can be reduced while maintaining the quality at the receiving station of the final stage.

According to the wireless communication apparatus of this embodiment, when the processing time of the relay station is distributed to a plurality of the relay stations by taking the processing time and processing ability of a terminal (a potential or a load such as a CPU speed) into consideration, it is also possible to increase data amount to be relayed. For example, in the case where the relaying operation is performed by using only one terminal with the repetition number 8 in the method of the related art, data amount to be relayed can be increased by using four terminal with the repetition number 2.

In the related art, when there is any error in the hard decision bits after performing the error correction decoding processings repetitively, since the signal is not relayed, the improvement of the reliability resulted from the error correction decoding processings becomes wasteful. In contrast, according to the wireless communication apparatus explained above, since the soft decision values extracted from the signal on the way of the error correction decoding processing is transmitted, the receiving station can attain the effects of improving the reliability resulted from the error correction decoding processings even if there is any error in the hard decision bits. Thus, the error rate property at the receiving station can be improved.

Further, in the related art, in the case where there is any error in the hard decision bits after the error correction decoding processings, since the hard decision bits before the error correction decoding processing is relayed, the generated decision error is transmitted to the receiving station. Thus, the error rate property at the receiving station is degraded. In contrast, according to the aforesaid configuration, when there is any error in the signal subjected to the hard decision processing, the soft decision values extracted from the signal on the way of the error correction decoding processing is transmitted. Thus, since the signal which reliability is improved by the error correction decoding processing can be transmitted, the possibility that the receiving station can correctly receive the signal can be enhanced.

The wireless communication apparatus of this embodiment may be arranged to notify the iteration number adaptively to the relay station in accordance with the processing being executed. For example, in such a case where the receiving station receives a high-definition image, since a load of the processing at the receiving station is large, the apparatus notifies to the relay station so as to increase the iteration number of the error correction decoding processing.

The iteration number at the relay station may be controlled in accordance with the condition required for the quality of the received signal. For example, in the case of receiving VoIP (Voice Over IP) etc. at which the processing delay is desired to be quite small but the error rate may be low, the iteration number at the relay station is made small to reduce the relay delay amount to a small value.

Alternatively, the iteration number at the relay station may be shared in a manner that a plurality of the receiving stations communicate to each other so as to share the resource of the relay station. For example, the receiving station 1 may sets the iteration number at the relay station to 2, whilst the receiving station 2 may sets the iteration number at the relay station to 6. Thus, since the iteration desired to be processed at the relay station can be instructed from the receiving station, the resource of the relay station can be used without any waste.

On the contrary, the relay station may notify the iteration number capable of being processed therein to the receiving station. The receiving station notifies the iteration number desired to be processed by the relay station to the relay station, and so the relay station performed the relaying processing for the number of times equal to the iteration number instructed from the receiving station. Thus, the resource of the relay station can be used without any waste.

A mobile station may control the iteration processing at the relay station so that an amount of the iteration processing at the relay station is larger than that at the mobile station. At the time of relaying the signal, the effects of the error rate reduction as the entirety of the system is further enhanced as an amount of error generated at the front stage is smaller. Thus, so long as the iteration number is the same as a whole, the entire efficiency is improved when the iteration number at the relay station is increased as compared with the iteration number at the mobile station.

Although the invention is explained in detail and with reference to the particular embodiments, it will be apparent for those skilled in the art to modify and change the embodiments in various manner without departing from the spirit and scope of the invention.

The present application is based on Japanese Patent Application (2005-059245) filed on Mar. 3, 2005, the content of which is incorporated herein by reference.

INDUSTRIAL APPLICABILITY

According to the invention, since not the "hard decision values" but the "soft decision values" are transmitted, error can be corrected flexibly without wasting consumed resources while maintaining the improvement of reliability resulted from the error correction. Further, the invention is useful for a wireless communication apparatus etc. having a function of relaying the signal transmitted from the transmission station to the receiving station.

The invention claimed is:

1. An error correction method for a wireless communication apparatus having a function of relaying a signal transmitted from a transmission station to a receiving station, comprising:
receiving a signal from the transmission station;
subjecting the received signal to an error correction decoding processing;
subjecting the signal after the error correction decoding processing to a hard decision processing;
detecting error of the signal subjected to the hard decision processing;
extracting a soft decision value from a signal which is being subjected to the error correction decoding processing when there is error in the signal subjected to the hard decision processing;
re-coding the extracted soft decision value; and
transmitting the re-coded soft decision value.

2. The error correction method according to claim 1, wherein the soft decision value is extracted based on an iteration number in the extracting process.

3. The error correction method according to claim 1, wherein the soft decision value is extracted based on an iteration time in the extracting process.

4. The error correction method according to claim 1, wherein the error correction decoding processing includes:

calculating bit likelihood of the received signal;

processing the received signal repeatedly to correct error of the signal; and converting the bit likelihood of the signal which is being subjected to the repetitive processing into the soft decision value.

5. The error correction method according to claim 4, wherein the process of processing the received signal repeatedly to correct the error of the signal includes:

decoding the received signal in a first decoder;

rearranging output data of the first decoder;

decoding an output which is generated by rearranging the output data in a second decoder; and rearranging output data of the second decoder and returning the rearranged output data of the second decoder to the first decoder.

6. The error correction method according to claim 1, further comprising determining an iteration number in accordance with ability of the error correction decoding processing at the receiving station.

7. The error correction method according to claim 6, wherein in the process of determining the iteration number, based on iteration number instruction information transmitted from the receiving station, the iteration number is reduced when the ability of the error correction decoding processing at the receiving station is high and the iteration number is increased when the ability of the error correction decoding processing at the receiving station is low.

* * * * *